(12) United States Patent
Gong et al.

(10) Patent No.: US 12,067,674 B2
(45) Date of Patent: Aug. 20, 2024

(54) IMAGE BLENDING MODES SYSTEMS AND METHODS

(71) Applicant: Apple Inc., Cupertino, CA (US)

(72) Inventors: Yun Gong, Cupertino, CA (US); Jim C Chou, San Jose, CA (US); Guy Cote, Aptos, CA (US)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 17/934,138

(22) Filed: Sep. 21, 2022

(65) Prior Publication Data
US 2024/0096010 A1    Mar. 21, 2024

(51) Int. Cl.
*G06T 15/50* (2011.01)
*G06T 3/18* (2024.01)

(52) U.S. Cl.
CPC .............. *G06T 15/503* (2013.01); *G06T 3/18* (2024.01)

(58) Field of Classification Search
CPC ................................ G06T 15/503; G06T 3/18
See application file for complete search history.

(56) References Cited

U.S. PATENT DOCUMENTS

| | | |
|---|---|---|
| 6,160,907 A | 12/2000 | Robotham et al. |
| 6,198,477 B1 | 3/2001 | Kurtze et al. |
| 7,167,184 B2 * | 1/2007 | Graham ................ G06T 15/503 345/592 |
| 7,793,012 B2 | 9/2010 | Kaneko |
| 8,385,726 B2 | 2/2013 | Kuno |
| 10,037,618 B2 * | 7/2018 | Robertson .............. H04N 5/275 |
| 10,706,660 B2 | 7/2020 | LeMay et al. |
| 10,817,983 B1 * | 10/2020 | Da Silva Quelhas ...... G06T 15/503 |
| 11,321,910 B2 | 5/2022 | Doyle et al. |
| 2012/0206474 A1 * | 8/2012 | Holland ................ G09G 5/377 345/589 |

(Continued)

FOREIGN PATENT DOCUMENTS

| KR | 10-2021-0116168 A | 9/2021 |
|---|---|---|
| KR | 20210116168 A * | 9/2021 |

(Continued)

OTHER PUBLICATIONS

KR20210116168A (Machine Translation on Jan. 12, 2024) (Year: 2021).*

(Continued)

*Primary Examiner* — Michael Le
(74) *Attorney, Agent, or Firm* — Fletcher Yoder P.C.

(57) ABSTRACT

A device may include an electronic display to display an image frame based on blended image data and image processing circuitry to generate the blended image data by combining first image data and second image data via a blend operation. The blend operation may include receiving graphics alpha data indicative of a transparency factor to be applied to the first image data to generate a first layer of the blend operation. The blend operation may also include overlaying the first layer onto a second layer that is based on the second image data. Overlaying the first layer onto the second layer may include adding first pixels values of the first image data that include negative pixel values and are augmented by the transparency factor to second pixel values of the second image data to generate blended pixel values of the blended image data.

20 Claims, 12 Drawing Sheets

(56) References Cited

U.S. PATENT DOCUMENTS

2020/0410748 A1\* 12/2020 Glen ...................... G09G 5/026
2021/0027685 A1\* 1/2021 Kang ....................... G09G 3/20
2022/0262009 A1\* 8/2022 Yu ........................... G06T 7/194

FOREIGN PATENT DOCUMENTS

KR     10-2022-0078005 A     6/2022
KR         20220078005 A  \*  6/2022

OTHER PUBLICATIONS

KR20220078005A (Machine Translation on Jan. 12, 2024) (Year: 2022).\*

Zitnick, C. Lawrence, et al., "High-quality video view interpolation using a layered representation," Interactive Visual Media Group, Microsoft Research, ACM Transactions on Graphics, vol. 23, Issue 3, Aug. 2004, pp. 600-608.

International Search Report and Written Opinion for PCT Application No. PCT/US2023/032985 dated Jan. 8, 2024; 9 pgs.

\* cited by examiner

IMAGE BLENDING MODES SYSTEMS AND METHODS

BACKGROUND

The present disclosure relates generally to displayed image processing and, more particularly, to blending images from multiple sources into a single image.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual information such as text, still images, and/or video by displaying one or more images. For example, such electronic devices may include computers, mobile phones, portable media devices, tablets, televisions, virtual-reality headsets, and vehicle dashboards, among many others. To display an image, an electronic display may control light emission of its display pixels based at least in part on corresponding image data. Moreover, the image data may be processed to account for one or more physical or digital effects associated with displaying the image data. For example, image data may be compensated for pixel aging (e.g., burn-in compensation), cross-talk between electrodes within the electronic device, transitions from previously displayed image data (e.g., pixel drive compensation), warps, contrast control, and/or other factors that may cause distortions or artifacts perceivable to a viewer.

In some scenarios, such as in virtual reality, mixed reality, and/or augmented reality, it may be desired to incorporate image data from multiple sources in an image frame. For example, a generated object may be incorporated into an image capture (e.g., via a camera) of a real-life surrounding. Yet combining image data from multiple sources may sometimes result in imagery that appears unnatural or otherwise out of place.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with embodiments of the present disclosure, image blending may be utilized (e.g., for virtual reality, mixed reality, and/or augmented reality) to incorporate image data from multiple sources into a single image frame. For example, a generated object may be incorporated into an image capture (e.g., via a camera) of a real-life surrounding, a portion of a captured image may be incorporated into a virtual surrounding, and/or a combination of both. As such, the image data of multiple sources may be blended together to form a single output image.

In some embodiments, image processing circuitry may perform blending in a warped image space. For example, the image data of each source may be rendered in and/or converted to a common image space. The warping may provide compensation for environmental effects, properties of the display, a viewer's point-of-view perspective, image processing warps such as shifts and scaling, and/or other distorting factors. Furthermore, different blending modes may be implemented such as a differential rendering (DR) blend, which may take into account shadow effects, a matting blend, and/or a combined blend mode utilizing aspects of both the matting blend and the DR blend.

For example, in the matting blend mode, matting data may be generated based on a set of captured image data (e.g., camera image data) to indicate which portion(s) of the captured image data are to be utilized in the blend. In other words, the matting data may be used to differentiate a layer of image data to be stacked or otherwise combined during blending. For example, a camera feed of image data (e.g., captured image data corresponding to one or more color components such as red image data, green image data, and blue image data (RGB image data)) may show a person's hand out in front of them. The matting data may be generated to outline/represent the portion of the camera feed's image data that is associated with the hand or other desired content. The matting data may then be combined with the camera feed's image data (e.g., RGB image data) to form matting alpha data. The matting alpha data may be representative of the RGB image data portion of the image to be used in the blending with opacity information (e.g., alpha) that defines which portion of the captured image data is visible after the blend. The matting alpha data may then be used to combine (e.g., via overlaying) the captured image data with another set of input image data (e.g., graphics image data). For example, layers may be assigned to the different sets of image data, and the pixel values of the captured image data may be overlaid (e.g., to replace or be summed with) the other set of input image data (e.g., graphics image data) based on the matting alpha data.

Additionally or alternatively, DR blending may include generating a set of graphics image data that includes negative pixel values (e.g., negative colors) and graphics alpha data that differentiates the portions of the graphics image data that is to be overlaid with other image data (e.g., via opacity information). For example, graphics image data may be generated to be representative of an object and a projected shadow for the object. The projected shadow may correspond to negative image data that, when blended with other image data (e.g., captured image data), is additively summed with the other image data based on the graphics alpha data. The graphics alpha data may represent which portion of the graphics image data and/or how the graphics image data is summed with the other image data. Furthermore, in some embodiments, DR blending and matting blending may be performed together to generate multiple layers of graphics and/or captured image data to be blended for a single image frame.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
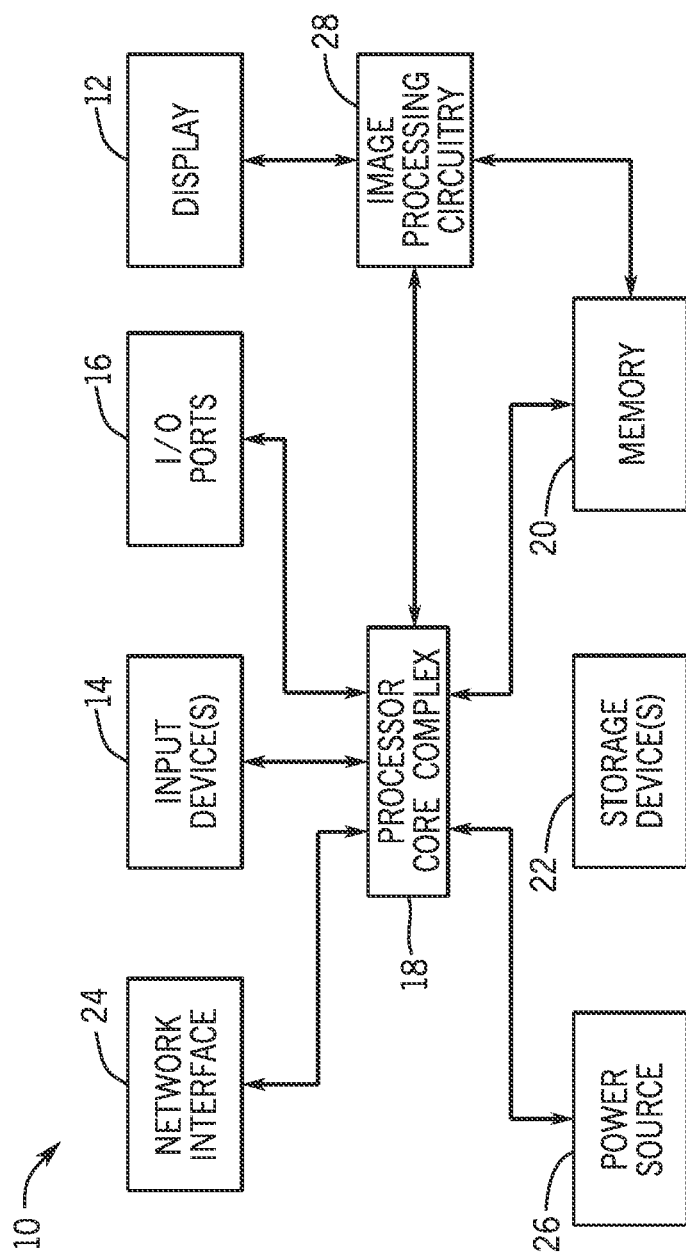
FIG. 1 is a schematic diagram of an electronic device that includes an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the luminance (and, as a consequence, the color) of its display pixels based on corresponding image data received at a particular resolution. For example, an image data source may provide image data as a stream of pixel data, in which data for each pixel indicates a target luminance (e.g., brightness and/or color) of one or more display pixels located at corresponding pixel positions. In some embodiments, image data may indicate luminance per color component, for example, via red component image data, blue component image data, and green component image data, collectively referred to as RGB image data (e.g., RGB, sRGB). Additionally or alternatively, image data may be indicated by a luma channel and one or more chrominance channels (e.g., YCbCr, YUV, etc.), grayscale (e.g., gray level), or other color basis. It should be appreciated that a luma channel, as disclosed herein, may encompass linear, non-linear, and/or gamma-corrected luminance values.

Additionally, the image data may be processed to account for one or more physical or digital effects associated with displaying the image data. For example, image data may be compensated for pixel aging (e.g., burn-in compensation), cross-talk between electrodes within the electronic device, transitions from previously displayed image data (e.g., pixel drive compensation), warps, contrast control, and/or other factors that may cause distortions or artifacts perceivable to a viewer.

Additionally, image blending may be utilized (e.g., for virtual reality, mixed reality, and/or augmented reality) to incorporate image data from multiple sources into a single image frame. For example, a generated object may be incorporated into an image capture (e.g., via a camera) of a real-life surrounding, a portion of a captured image may be incorporated into a virtual surrounding, and/or a combination of both. As such, the image data of multiple sources may be blended together to form a single output image.

The multiple sources of image data may include captured image data (e.g., via a camera), generated (e.g., via one or more processors) image data, and/or received, stored, or otherwise predefined image data. As should be appreciated, the sources of the image data to be blended are given as non-limiting examples, and any suitable portions of image data may be blended into a single image frame. Moreover, in some embodiments, one or more sources of the image data may be providing real-time image data (e.g., a camera feed, a continuously processed graphics feed, etc.), and the blending may be performed in real-time such that real-world inputs (e.g., the camera feed and/or input/output devices) may affect the received image data.

In some embodiments, image processing circuitry may perform blending in a warped image space. For example, the image data of each source may be rendered in and/or converted to the warped image space. The warping may provide compensation for environmental effects, properties of the display, a viewer's point-of-view perspective, image processing warps such as shifts and scaling, and/or other distorting factors. For example, image data from a camera may be warped to compensate for lens distortions associated with capturing the image and/or for any lensing effects of the display panel. As should be appreciated, the image data from the multiple sources may be blended in any suitable common image space. For example, the image data from each source may be rendered in or converted (e.g., warped) to a display image space such that the image data is not warped after blending or the image data may be blended in an intermediate warp space and be warped to the display image space after blending.

Furthermore, different blending modes may be implemented such as a differential rendering (DR) blend, a matting blend, and/or a combined blend mode utilizing aspects of both the matting blend and the DR blend. For example, in the matting blend mode, matting data may be generated based on a set of the input image data (e.g., captured image data) to indicate which portion(s) of the input image data are to be utilized in the blend. In other words, the matting data may be used to differentiate a layer of image data to be "stacked" (e.g., overlaid and/or combined) during blending. For example, a camera feed of image data (e.g., image data corresponding to one or more color components such as red image data, green image data, and blue image data (RGB image data)) may show a person's hand out in front of them. The matting data may be generated to outline/represent the portion of the camera feed's image data that is associated with the hand. The matting data may then be combined with the camera feed's image data (e.g., RGB image data) to form matting alpha data. The matting alpha data may be representative of the RGB image data portion of the image to be used in the blending with opacity information (e.g., alpha). The matting alpha data may then be used to combine (e.g., via overlaying) the camera feed image data with another set of input image data (e.g., graphics image data). For example, layers may be assigned to the different sets of image data, and the pixel values of the camera feed image data may be overlaid (e.g., to replace or be summed with) the other set of input image data (e.g., graphics image data) based on the matting alpha data.

To produce realistic images with features such as shadows, DR blending may include generating a set of input image data (e.g., graphics image data) that includes negative pixel values (e.g., negative colors) and graphics alpha data that differentiates the portions of the input image data (e.g., graphics image data) that is to be overlaid with other image data (e.g., captured image data or other graphics image data) and the portions of the input image data that may be summed with the other image data (e.g., via opacity information). For example, graphics image data may be generated to be representative of an object and a projected shadow for the object. The projected shadow may correspond to negative image data that, when blended with other image data (e.g., captured image data), is additively summed with the other image data to produce a darkened opacity that portrays the shadow. The graphics alpha data may represent which portion of and/or how the graphics image data is summed with the other image data. Furthermore, in some embodiments, DR blending and matting blending may be performed together to generate multiple layers of graphics and/or captured image data.

With the foregoing in mind, FIG. 1 is an example electronic device 10 with an electronic display 12 having independently controlled color component illuminators (e.g., projectors, backlights, etc.). As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry 28 (e.g., a graphics processing unit, a display image processing pipeline, etc.) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) (e.g., of an operating system or computer program), an application interface, text, a still image, and/or video content. The electronic display 12 may include a display panel with one or more display pixels to facilitate displaying images. Additionally, each display pixel may represent one of the sub-pixels that control the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance output (e.g., light emission) of the sub-pixels based on corresponding image data. In some embodiments, pixel or image data may be generated by an image source, such as the processor core complex 18, a graphics processing unit (GPU), or an image sensor (e.g., camera). Additionally, in some embodiments, image data may be received from another electronic device 10, for example, via the network interface 24 and/or an I/O port 16. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
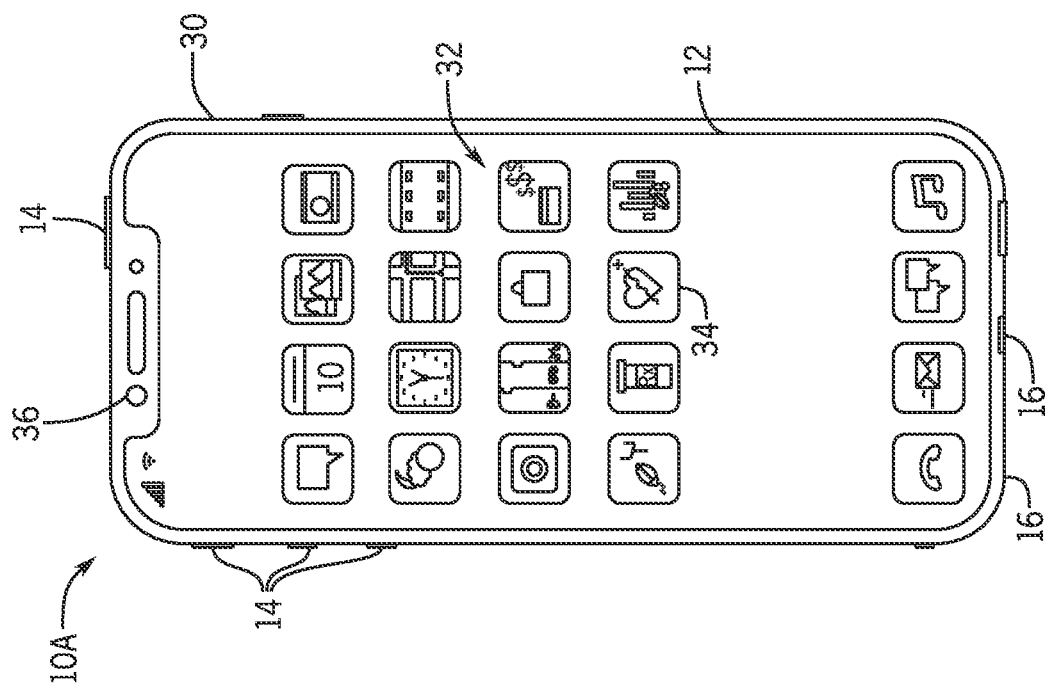
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 30 (e.g., housing) to, for example, protect interior components from physical damage and/or shield them from electromagnetic interference. The enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Input devices 14 may be accessed through openings in the enclosure 30. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
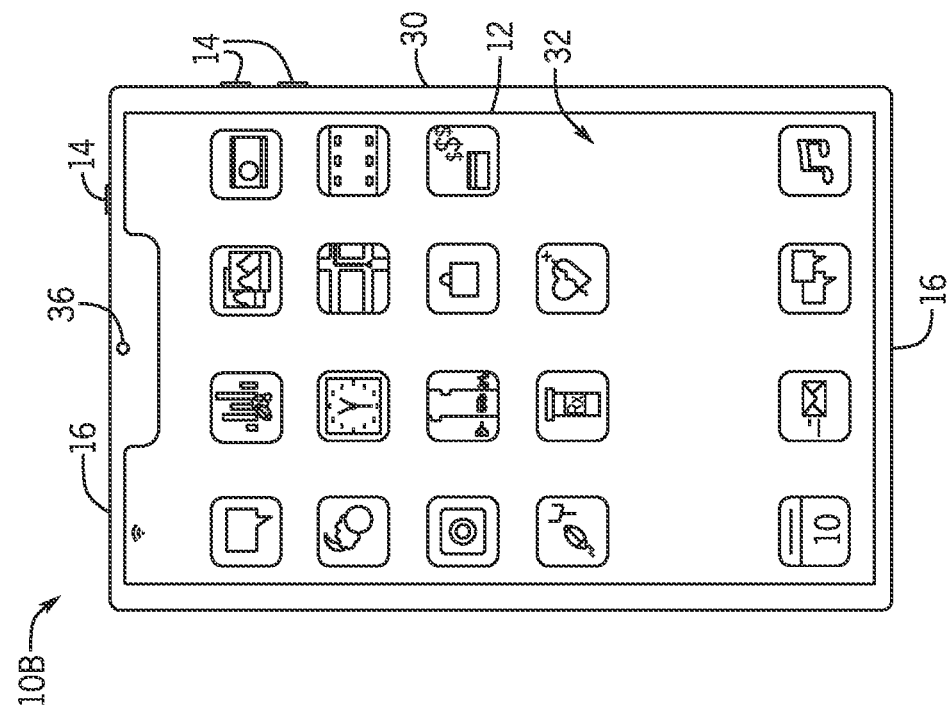
FIG. 3 is another example of the electronic device of FIG. 1 in the form of a tablet device, in accordance with an embodiment.
Figure 4:
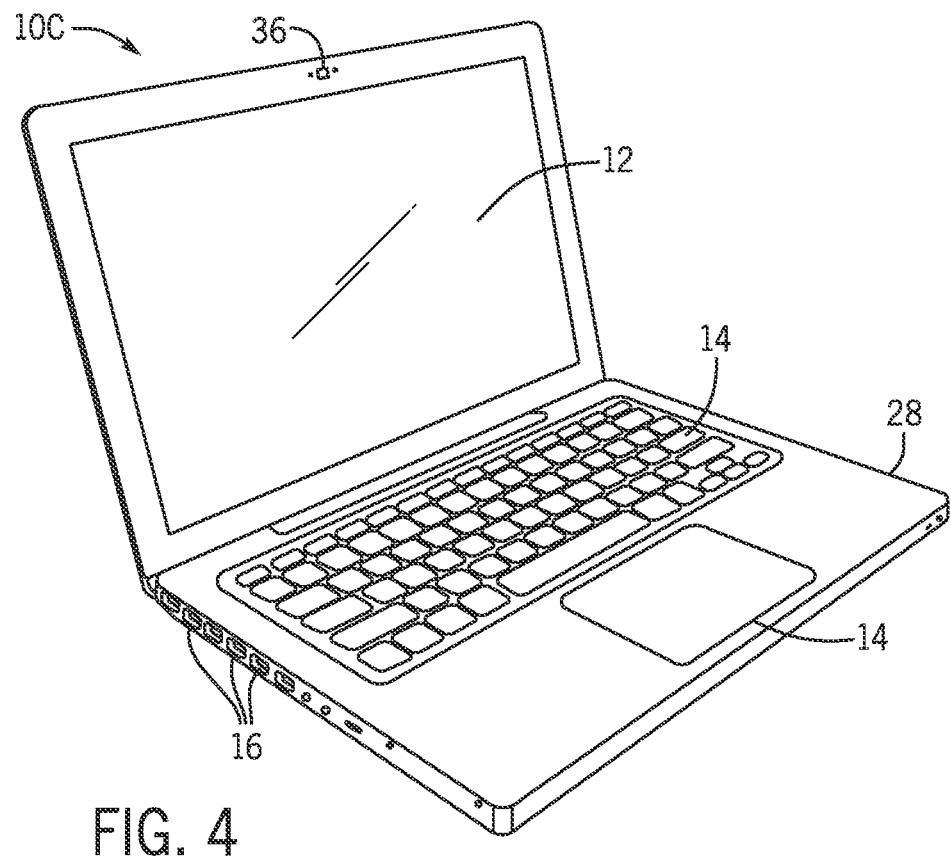
FIG. 4 is another example of the electronic device of FIG. 1 in the form of a computer, in accordance with an embodiment.
Figure 5:
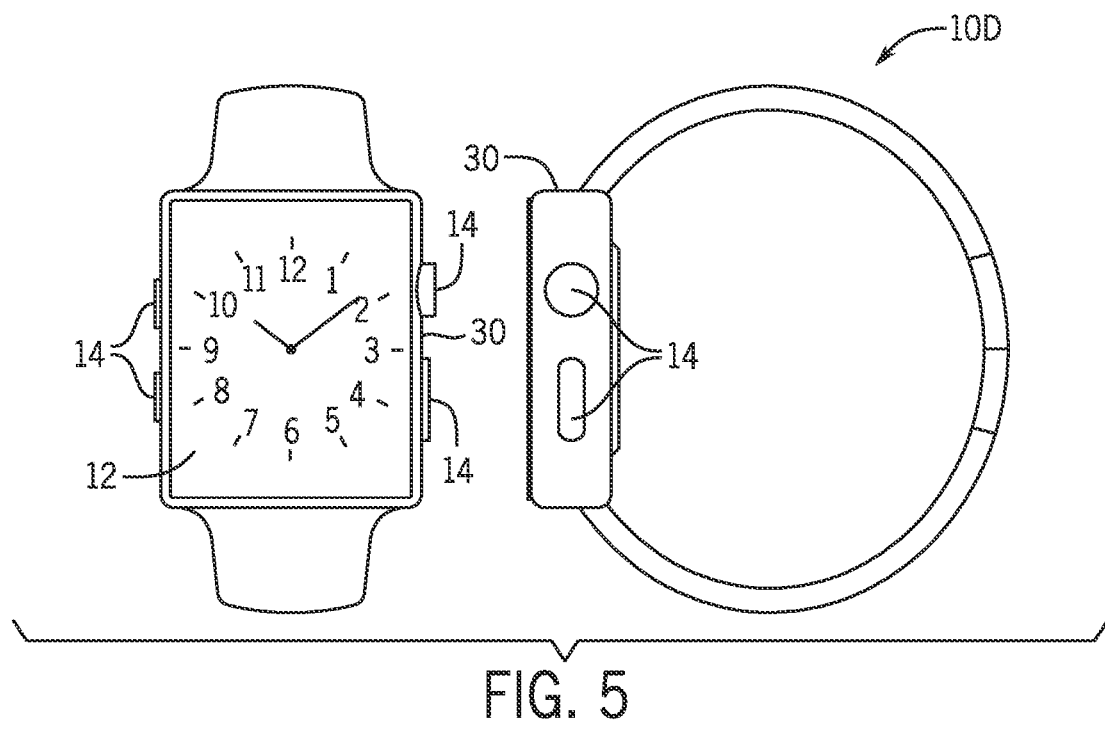
FIG. 5 is another example of the electronic device of FIG. 1 in the form of a watch, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MAC-BOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
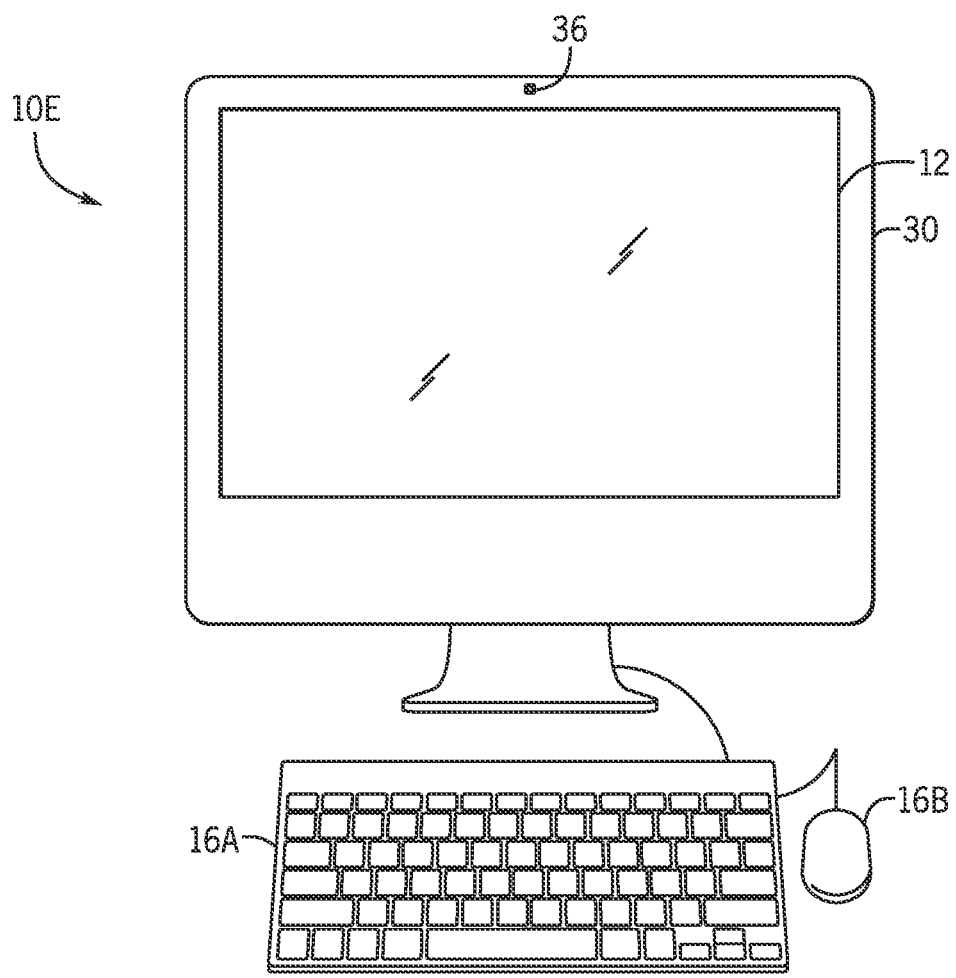
FIG. 6 is another example of the electronic device of FIG. 1 in the form of a computer, in accordance with an embodiment.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

As described above, the electronic display 12 may display images based at least in part on image data. Before being used to display a corresponding image on the electronic display 12, the image data may be processed, for example, via the image processing circuitry 28. In general, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 7:
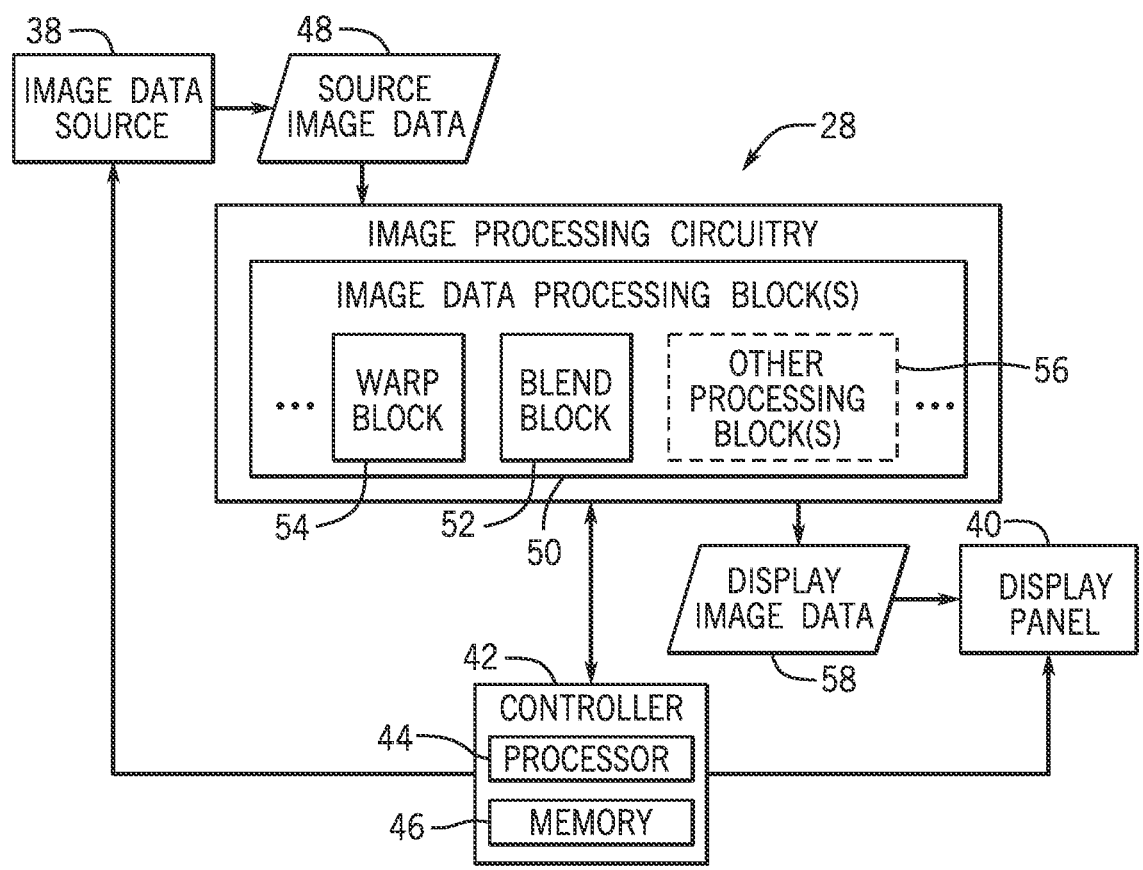
FIG. 7 is a schematic diagram of the image processing circuitry of FIG. 1 including a warp block and a blend block, in accordance with an embodiment.

To help illustrate, a portion of the electronic device 10, including image processing circuitry 28, is shown in FIG. 7. The image processing circuitry 28 may be implemented in the electronic device 10, in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include hardware or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a reflective technology display, a liquid crystal display (LCD), or any other suitable type of display panel 40. In some embodiments, the controller 42 may control operation of the image processing circuitry 28, the image data source 38, and/or the display panel 40. To facilitate controlling operation, the controller 42 may include a controller processor 44 and/or controller memory 46. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an αRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue) or the sub-pixels themselves.

As described above, the image processing circuitry 28 may operate to process source image data 48 received from the image data source 38. The image data source 38 may include captured images (e.g., from one or more cameras 36), images stored in memory, graphics generated by the processor core complex 18, or a combination thereof. Additionally, the image processing circuitry 28 may include one or more sets of image data processing blocks 50 (e.g., circuitry, modules, or processing stages) such as a blend block 52 and a warp block 54. As should be appreciated, multiple other processing blocks 56 may also be incorporated into the image processing circuitry 28, such as a pixel contrast control (PCC) block, color management block, a dither block, a burn-in compensation (BIC) block, a scaling/rotation block, etc. before and/or after the blend block 52 and/or the warp block 54. The image data processing blocks 50 may receive and process source image data 48 and output display image data 58 in a format (e.g., digital format and/or resolution) interpretable by the display panel 40. Further, the functions (e.g., operations) performed by the image processing circuitry 28 may be divided between various image data processing blocks 50, and, while the term "block" is used herein, there may or may not be a logical or physical separation between the image data processing blocks 50.

Figure 8:
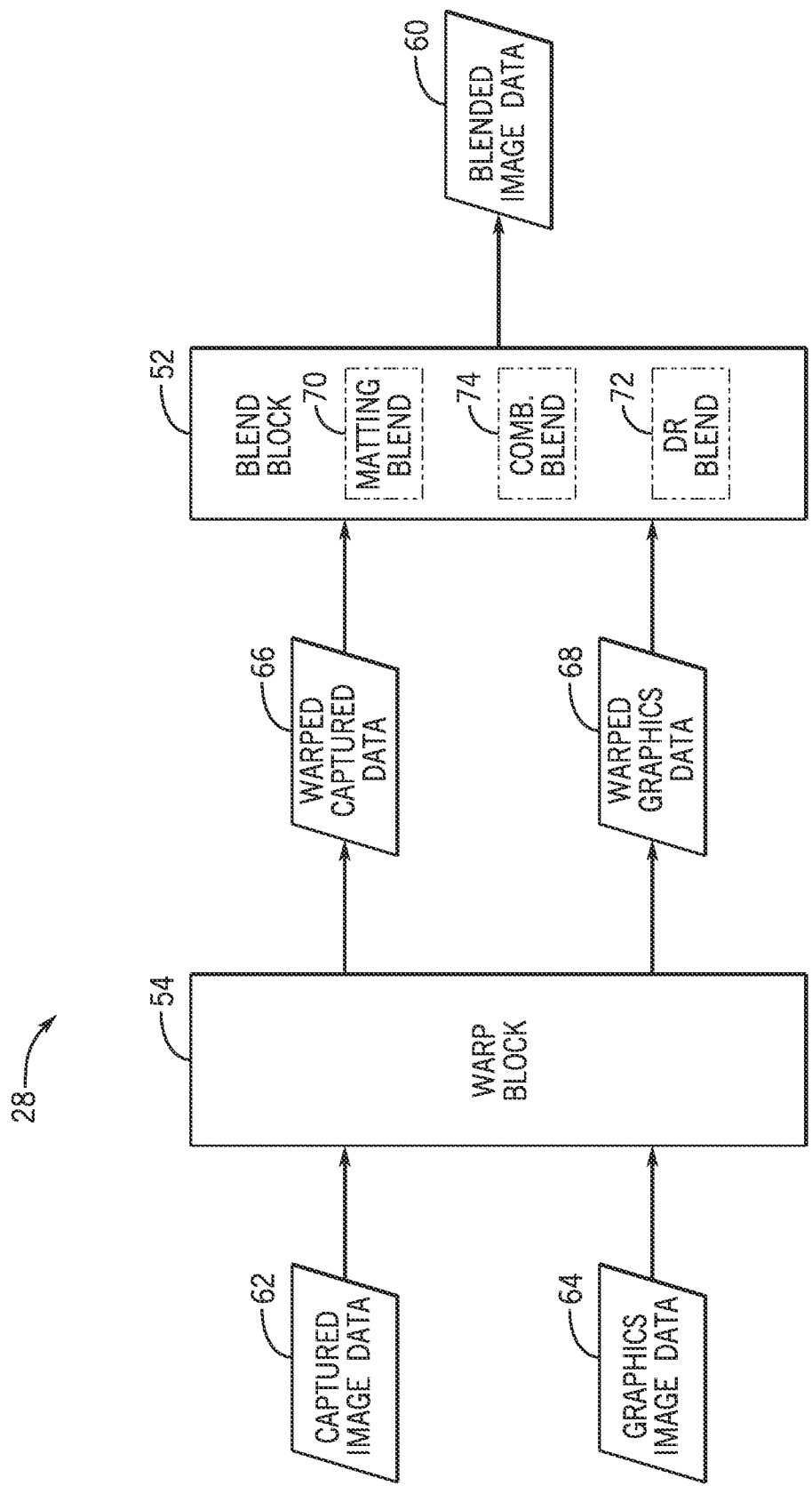
FIG. 8 is a schematic diagram of a portion of the image processing circuitry of FIG. 7, in accordance with an embodiment.

In some embodiments, the blend block 52 and warp block 54 may process multiple sets of source image data 48 from one or multiple image data sources 38 to generate blended image data for a single image frame. For example, as illustrated in the portion of the image processing circuitry of FIG. 8, the blended image data 60 may be based on multiple sets in image data (e.g., captured image data 62 and graphics image data 64). Although discussed herein as captured image data 62 and graphics image data 64, it should be appreciated that any suitable image data sources 38 may be utilized, and the blended image data 60 may be a combination of multiple sets of captured image data 62, multiple sets of graphics image data 64, or a combination of captured image data 62 and graphics image data 64. Moreover, the graphics image data 64 may be considered as any stored, received, processed, or otherwise generated image data. For example, the graphics image data 64 may be indicative of virtual reality/mixed reality/augmented reality content. Furthermore, the captured image data 62 may be representative of any real-world content such as captured images, objects, or scenes, and may be indicative of real-time image captures (e.g., a camera feed) or pre-captured content.

As discussed above, the multiple sets of source image data 48 (e.g., captured image data 62 and graphics image data 64) may come from multiple image data sources 38. As such, the image space (e.g., perspective and/or contour) of the different source image data 48 may also be different. For example, captured image data 62 may include distortions associated with a camera lens and the graphics image data 64 may be generated based on an undistorted virtual content rendering. As such, the captured image data 62 and/or the graphics image data 64 may be warped (e.g., via the warp block 54) to a common image space such that the image contents of the different source image data 48 may be aligned and blended in the same image space. As should be appreciated, the warp block 54 may perform or provide for one or multiple different compensations for any of a variety of effects and generate warped captured data 66 and warped graphics data 68. For example, the warp block 54 may compensate for environmental effects, properties of the display, a viewer's point-of-view perspective, image processing warps such as shifts and scaling, and/or other distorting factors. In some embodiments, the captured image data 62 and graphics image data 64 may be warped to a common image space of the display image data 58. For example, the warped captured data 66 and the warped graphics data 68 may be compensated for one or more lensing effects of the display panel 40, for example, to counteract the shape of and/or glass refractions of the display panel 40. Alternatively, as should be appreciated, the warped captured data 66 and the warped graphics data 68 may be warped to any common image space for blending. Moreover, although shown if FIG. 8 as blending after the warp block 54, additional warping may also be performed on the blended image data 60 after the blend block 52.

Figure 9:
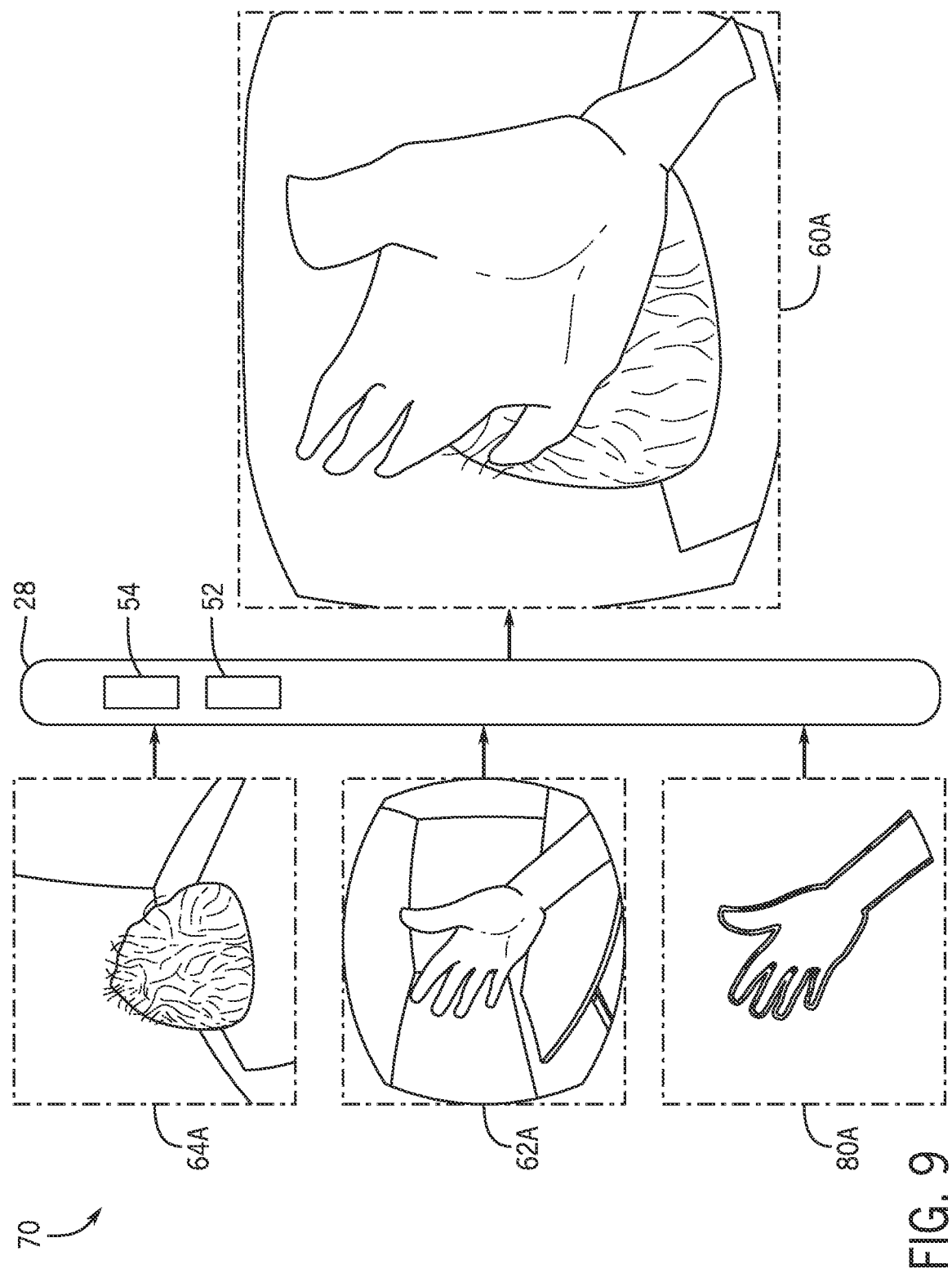
FIG. 9 is a schematic diagram of example captured image data and graphics image data blended via a matting blend, in accordance with an embodiment.

In some embodiments, the blend block 52 may utilize one or more blending modes such as a matting blend 70, a differential rendering (DR) blend 72, and/or a combined blend 74 mode utilizing aspects of both the matting blend 70 and the DR blends 72. For example, in the matting blend 70, matting data 80 may be generated based on the captured image data 62 to indicate which portion(s) of the captured image data 62 are to be visible in the blend, as shown in FIG. 9. The matting blend 70 may be utilized to overlay (e.g., layer) a portion of the captured image data 62 onto the graphics image data 64 such as, for example, for use in augmented or mixed reality. In other words, the matting data 80 may be used to select a portion of the captured image data 62 to be stacked or otherwise combined during blending. To help illustrate, example captured image data 62A may include a person's hand. Corresponding example matting data 80A may be generated to outline/represent the portion of the example captured image data 62A that is associated with the hand and/or other desired content. Furthermore, the image processing circuitry 28 (e.g., the warp block 54 and the blend block 52) may warp and blend the example graphics data 64A with the example captured image data 62A to generate the example blended image data 60A based on the example matting data 80A. As should be appreciated, the example blended image data 60A appears distorted in the example of FIG. 9 to compensate for distortions associated with the display panel 40. However, as discussed herein, the blend block 52 may operate in any common image space.

Additionally, while shown in FIG. 9 as being input into the blend block 52, the matting data 80 may be generated by the blend block 52 (e.g., in the common image space) or generated elsewhere (e.g., via one or more processors) and warped in the warp block 54 with the captured image data 62 and/or graphics image data 64.

Figure 10:
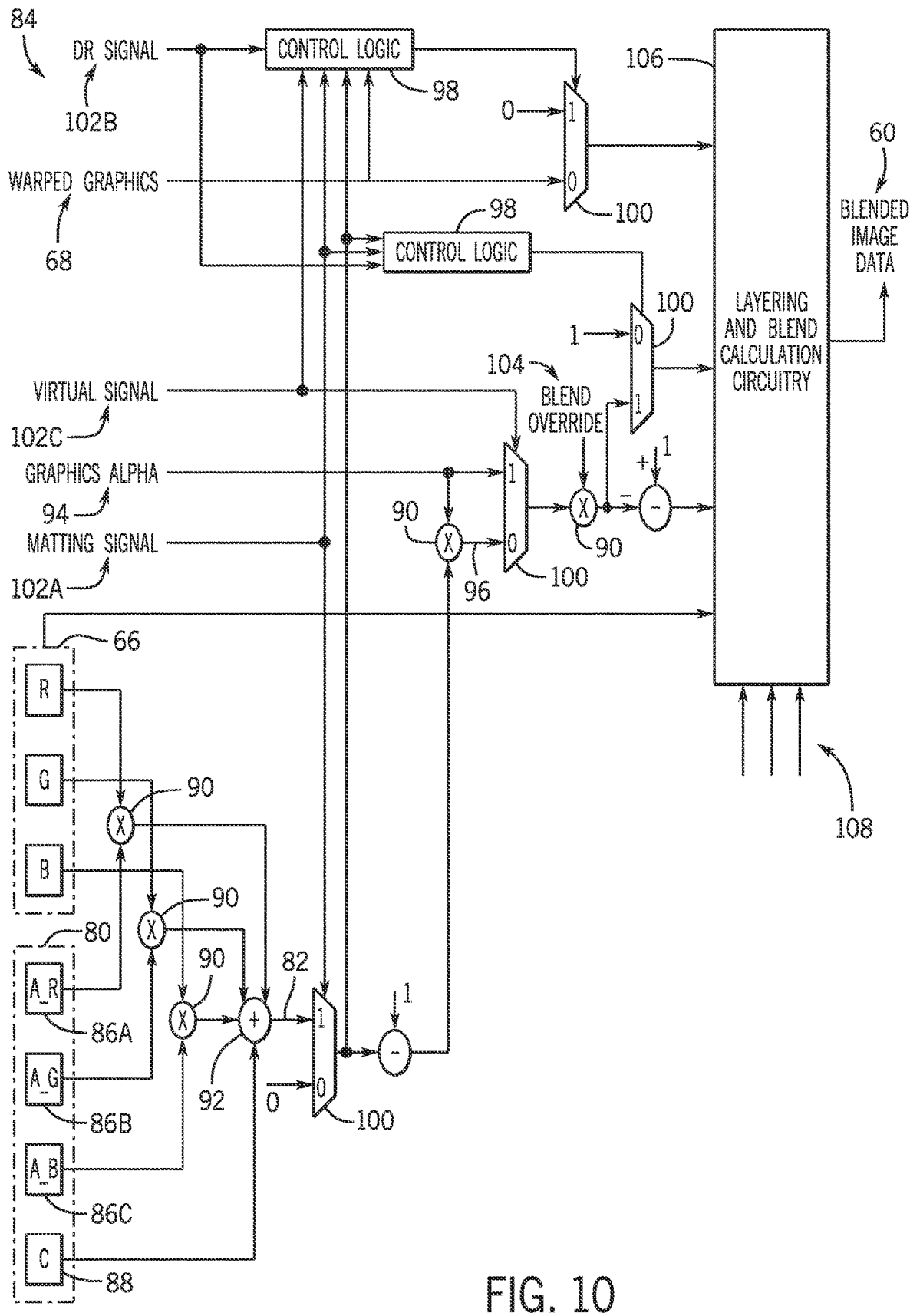
FIG. 10 is a schematic diagram of a portion of the blend block of FIGS. 7 and 8, in accordance with an embodiment.

The matting data 80 may also be combined with the captured image data 62 to form matting alpha data 82 as shown in the schematic diagram of a portion of the blend block 52 in FIG. 10. The matting alpha data 82 may be representative of the RGB image data of the warped captured data 66 to be used in the blending with opacity information (e.g., alpha) that defines which portion of the warped captured data 66 is visible after the blend. The matting alpha data 82 may then be used to combine (e.g., via overlaying or pixel value adding) the warped captured data 66 with another set of input image data (e.g., warped graphics data 68). In some embodiments, the matting data 80 may include separate alpha components 86 (e.g., a red alpha component 86A, a green alpha component 86B, and a blue alpha component 86C, cumulatively 86) indicative of a transparency (e.g., opacity) for each component channel and/or a constant transparency 88. The separate alpha components 86 may be multiplied (e.g., via a multiplier 90) by their respective component channels in the warped captured data 66 to generate the matting alpha data 82. Additionally, in some embodiments, the constant transparency 88 may be added to each component channel (e.g., via an adder 92), for example, to adjust an overall transparency for the matting alpha data 82. For example, the example matting data 80A of FIG. 9, may be combined with the captured image data 62 (e.g., before or after warping) to assign an opacity to the hand and a general transparency to the background of the captured image data 62 such that, when blended, the hand may be visible over the example graphics image data 64 (e.g., as in the example blended image data 60). Additionally, layers may be assigned to the different sets of image data, and the pixel values of the warped captured data 66 may be overlaid (e.g., to replace or be summed with) the warped graphics data 68 based on the matting alpha data 82.

Figure 11:
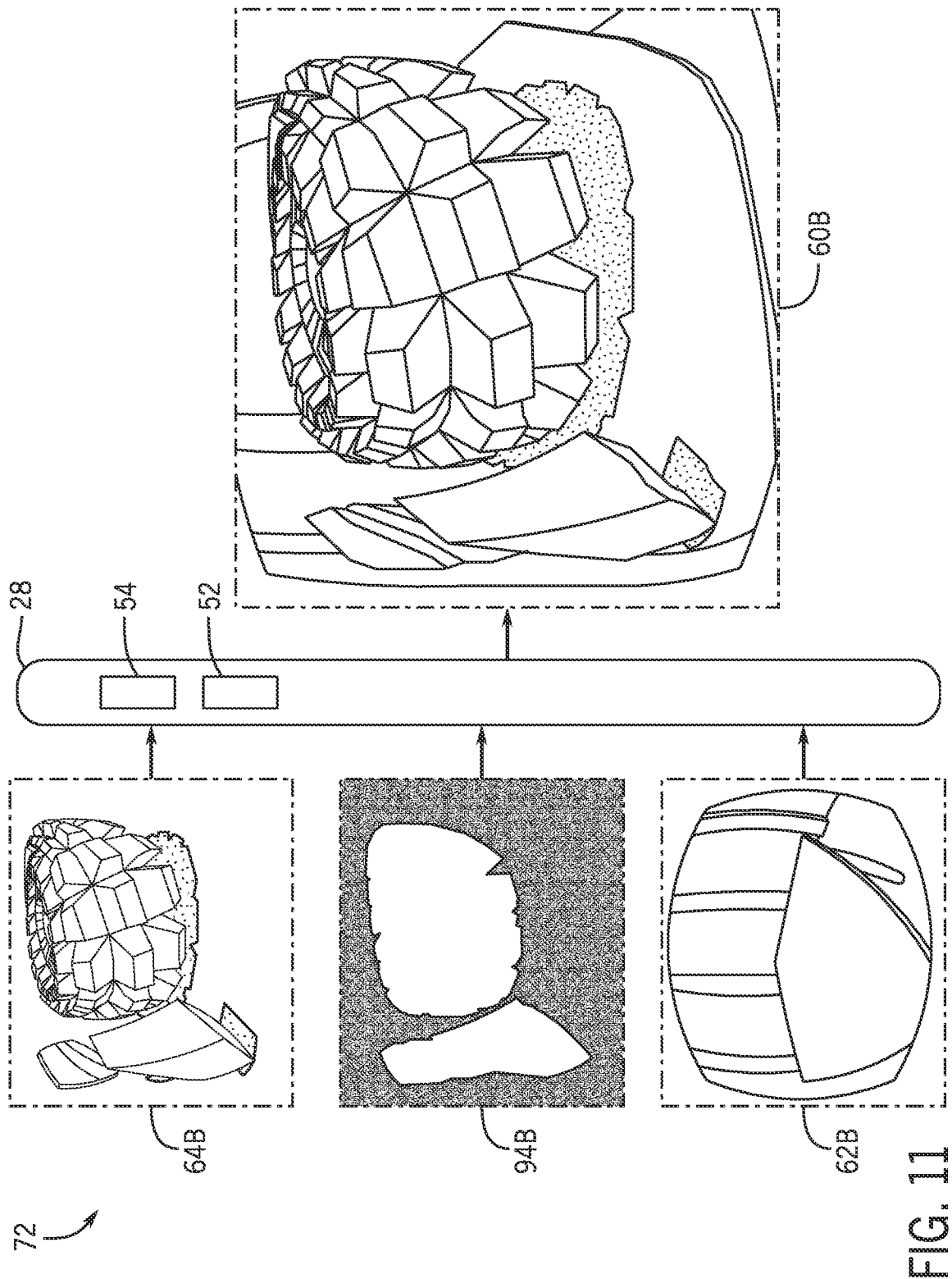
FIG. 11 is a schematic diagram of example captured image data and graphics image data blended via a differential rendering blend, in accordance with an embodiment.

To enable realistic shadows, the DR blend 72 may be utilized to layer graphics image data 64 onto the captured image data in augmented or mixed reality. In some embodiments, graphics image data 64 may be generated that includes negative pixel values (e.g., negative colors) that are intended to be overlaid with other image data (e.g., captured image data 62) such as, for example, to portray a shadow effect for the overlaid content, as shown in the example of FIG. 11. Additionally, graphics alpha data 94 may be generated that differentiates how the different portions of the graphics image data 64 are to be overlaid or combined (e.g., summed) with other image data (e.g., captured image data 62) such as via transparency (e.g., alpha) information. As used herein, the transparency information of the graphics alpha data 94 and/or matting data 80/matting alpha data 82 may be a pixel wise transparency factor describing how transparent or opaque the associated image data is at the pixel locations. Moreover, such transparency may be used to determine how to add the pixel values of multiple sets of image data during blending.

For example, graphics image data 64B may be generated to be representative of an object and a projected shadow for the object. The projected shadow may correspond to negative pixel values that, when blended with other image data (e.g., captured image data 62B), is additively summed (e.g., a weighted summation) with the other image data based on the graphics alpha data 94B. By adding the negative pixel values of the graphics image data 64B to the other image data (e.g., captured image data 62B) using a weighted summation (e.g., based on the transparency factor of the graphics alpha data 94B), more realistic shadow effects may be portrayed. Furthermore, if the weighted summation results in negative pixel values for the blended image data 60, in some embodiments, a floor may be established such that the negative pixel values of the blended image data 60 are replaced with grey levels of zero.

In the example of FIG. 11, the example graphics alpha data 94B may designate that the object is to be layered opaquely (e.g., overlaid on top of the captured image data 62B), and the remaining portion of the graphics image data 64 may be additively blended (e.g., based on the transparency information of the graphics alpha data 94B) with the example captured image data 62B to include a partially transparent layer over the captured image data 62B. Moreover, as should be appreciated, in some embodiments, pixel data representative of a background (e.g., other than the object and/or the projected shadow having negative pixel values) may have a net zero effect during blending (e.g., pixel values of zero and/or alpha values corresponding to full transparency). Additionally, as stated above, the graphics image data 64 may be generated by the electronic device 10 (e.g., via one or more processors and/or graphics processors). As such, in some embodiments, the graphics image data 64 may be generated as a pre-combined graphics alpha image data (not shown). For example, the pre-combined graphics alpha image data may include the color component pixel values (e.g., RGB pixel values) of the warped graphics data 68 combined with the graphics alpha data 94 in a similar manner as the matting alpha data 82. As such, the pre-combined graphics alpha image data may be utilized instead in the DR blend 72 instead of the individual warped graphics data 68 and graphics alpha data 94. As should be appreciated, the example blended image data 60B appears distorted in the example of FIG. 11 to compensate for distortions associated with the display panel 40. However, as discussed herein, the blend block 52 may operate in any common image space. Additionally, while shown in FIG. 11 as being input into the blend block 52, the graphics alpha data 94 may be generated by the blend block 52 (e.g., in the common image space) or generated elsewhere (e.g., via one or more processors) and warped in the warp block 54 with the captured image data 62 and/or graphics image data 64.

Figure 12:
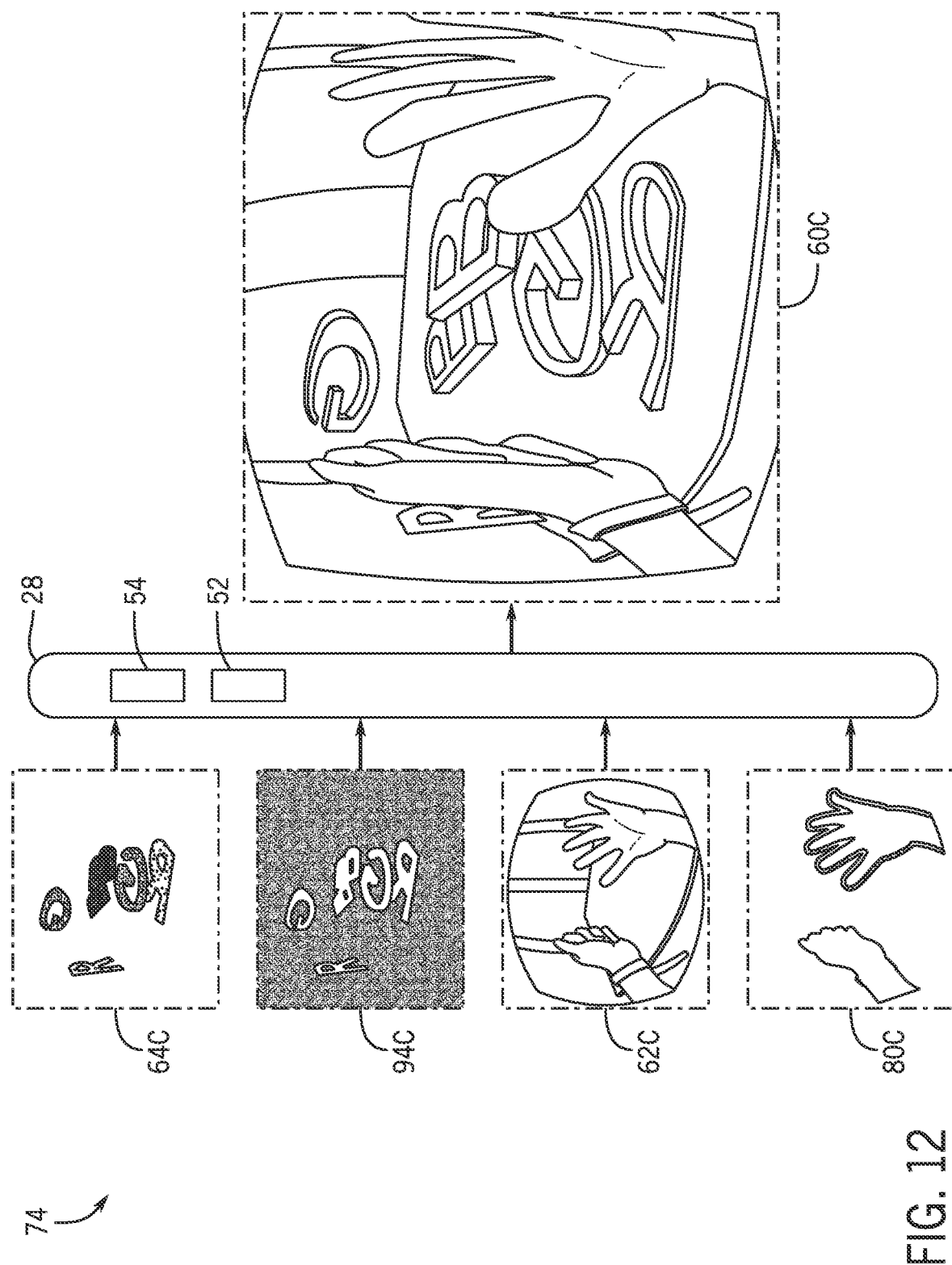
FIG. 12 is a schematic diagram of example captured image data and graphics image data blended via a combined blend, in accordance with an embodiment.

Additionally, in some embodiments, the matting blend 70 and the DR blend 72 may be utilized together in a combined blend 74, as exampled in FIG. 12. The combined blend 74 may be performed to generate multiple layers of graphics and/or captured image data to be blended for a single image frame. For example, graphics alpha data 94C may be utilized to indicate the portions of the graphics image data 64C that is to be layered on top of the captured image data 62C (e.g., opaque), and which portions are transparent (or partially transparent if negative pixel values are utilized) such that the captured image data 62C is visible. Additionally, the example matting 80C may be used to separate out a portion of the captured image data 62C that may be layered separately from the rest of the captured image data 62C. As such, in some embodiments, the combined blend 74 may layer a portion of the warped graphics data 68 over the warped captured data 66 and layer a portion of the warped captured data 66 over the warped graphics data 68 according to the opacity information of the graphics alpha data 94 and the matting data 80 (and/or the matting alpha data 82). As such, multiple layers of content may be blended to provide a more realistic aggregation of captured image data 62 and graphics image data 64.

Figure 13:
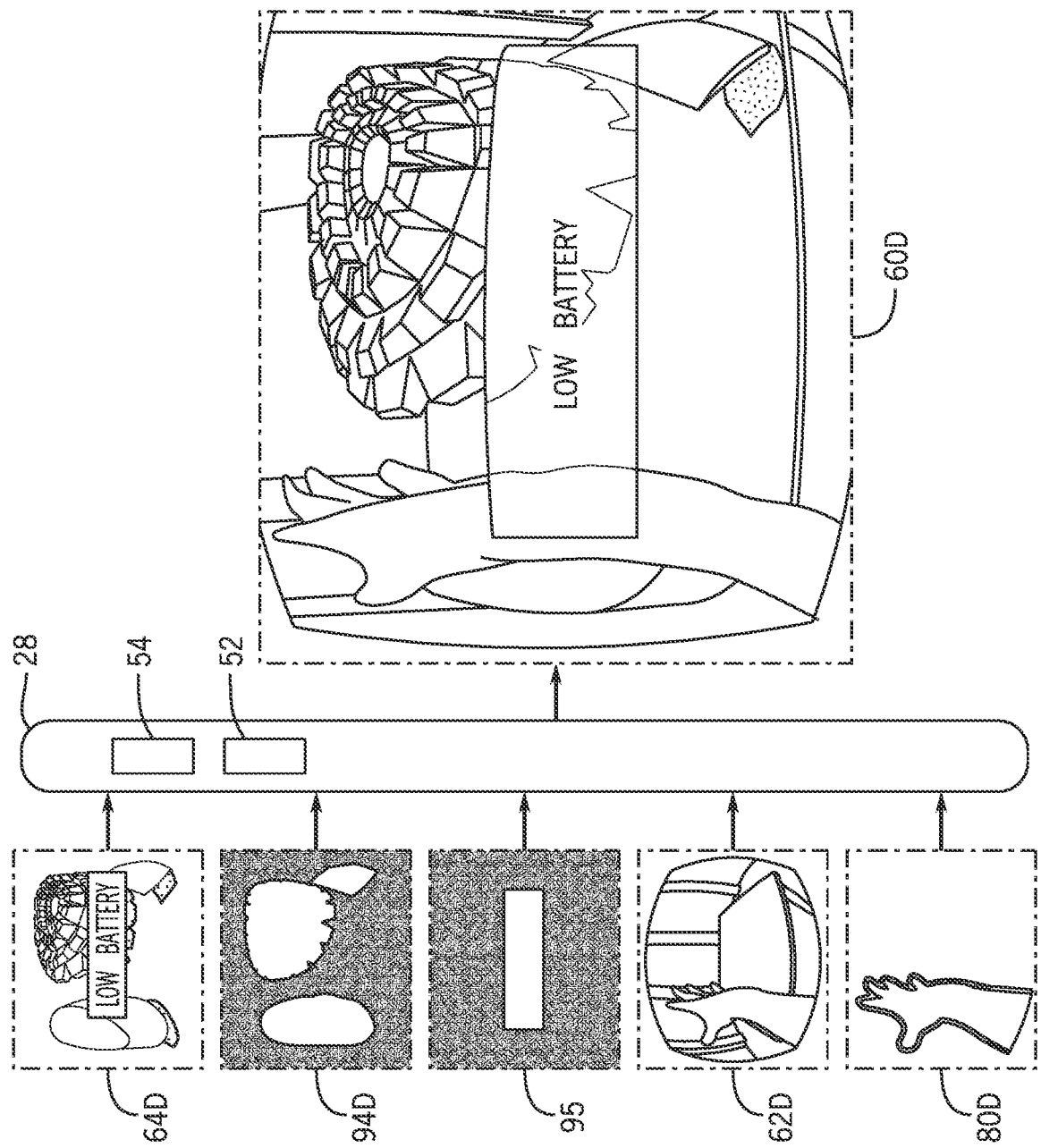
FIG. 13 is a schematic diagram of example captured image data and graphics image data blended via multi-layered combined blend, in accordance with an embodiment.

Additional layers of content may be generated using additional alpha data 95, as in the example of FIG. 13. The additional alpha data 95 may be utilized in conjunction with the graphics alpha data 94D and/or the matting data 80D to generate an additional layer (e.g., top layer) above the captured image data 62D and the graphics image data 64D to incorporate additional content into the blended image data 60D. As with the graphics alpha data 94, the additional alpha data 95 may include transparency (e.g., alpha) information that allows portions of or all of the lower layers of content to be visible therethrough. Such additional layers may be useful for displaying textual information to a user without hindering vision of what is in the lower layers or to make certain information/content stand out by making it opaque (e.g., such that lower layers are not visible).

Returning to FIG. 10, in some scenarios, such as when utilizing the combined blend 74, the graphics alpha data 94 and the matting alpha data 82 (or an inverse thereof) may be combined (e.g., added or multiplied) to generate a combined alpha 96. The combined alpha 96 may be representative of the viewable portions of the different layers of the warped captured data 66 and the warped graphics data 68 such that, when applied in the combined blend, the desired pixel data (e.g., RGB pixel data) is utilized from each set of image data with transparencies (e.g., additive pixel values) accounted for. Furthermore, as should be appreciated, while discussed herein as using particular sets of image data (e.g., warped captured data 66, warped graphics data 68, matting data 80, matting alpha data 82, graphics alpha data 94, etc.), the circuitry of the blend block 52 (e.g., portion 84) may operate on any suitable variation of the discussed image data such as inverses (e.g., 1−X), negatives (e.g., −1X), etc. Moreover, in some embodiments, the blend block 52 may include control logic 98 that operates and/or includes routing logic 100 such as gates, registers, and/or multiplexers.

In some embodiments, the control logic 98 and/or routing logic 100 may receive control signals 102 (e.g., a matting signal 102A, a DR signal 102B, and/or a virtual signal 102C, cumulatively labeled 102) to determine what type of blend (e.g., matting blend 70, DR blend 72, or combined blend 74) to perform and/or alter aspects of the blend. For example, a matting signal 102A may activate and/or provide for a matting blend 70 to be performed and a DR signal 102B may activate and/or provide for a DR blend 72 to be performed. Together, the matting signal 102A and the DR signal 102B may be used to activate and/or provide for the combined blend 74. Additionally, in some embodiments, a virtual signal 102C may be used to activate and/or provide for a blend override 104. The blend override 104 may be indicative of an overriding message (e.g., warning or other function) that is intended be substituted for or otherwise be layered over the other captured image data 62 and/or the graphics image data 64. Additionally, the blend block 52 may include layering and blend calculation circuitry 106 to compile the layers of image data (e.g., warped captured data 66, warped graphics data 68, etc.) according to the graphics alpha data 94, combined alpha data 96, and/or matting alpha data 82. For example, the layering and blend calculation circuitry 106 warped captured data 66 and the warped graphics data 68 may be summed (e.g., a weighted summation and/or weighted average based on corresponding alpha values) based on the graphics alpha data 94, combined alpha data 96, and/or matting alpha data 82. Moreover, in some embodiments, the layering and blend calculation circuitry 106 may receive predefined parameters 108 used in performing the blend. For example, such predefined parameters 108 may include but are not limited to a background color (e.g., layer 0 color), a saturation parameter, etc.

Figure 14:
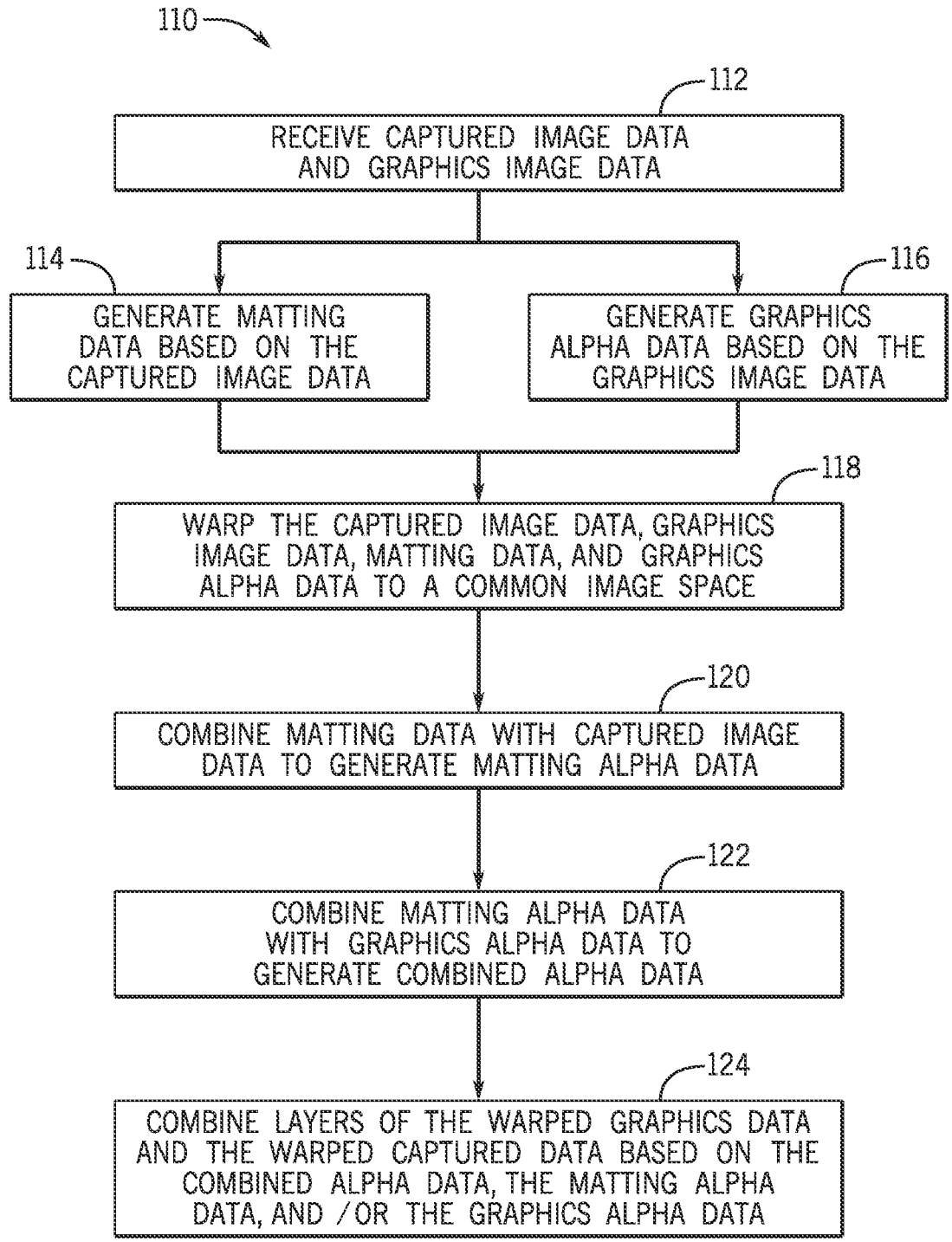
FIG. 14 is a flowchart of an example process for utilizing the matting blend, the differential rendering blend, or the combined blend, in accordance with an embodiment.

FIG. 14 is a flowchart 110 of an example process for using a matting blend 70, a DR blend 72, or a combined blend 74. Image processing circuitry 28 may receive (e.g., from one or more image data sources 38) captured image data 62 and graphics image data 64 (process block 112). If utilizing a matting blend 70 or a combined blend 74, matting data 80 may be generated based on the captured image data 62 (process block 114). Additionally, if utilizing a DR blend 72 or a combined blend 74, graphics alpha data 94 may be generated based on the graphics image data 64 (process block 116). As should be appreciated, in some embodiments, the graphics image data 64 may be generated as pre-combined graphics alpha image data such that the information of the graphics alpha data 94 is already known. Additionally, the captured image data 62, the graphics image data 64, the matting data 80, and/or the graphics alpha data 94 may be warped to a common image space (process block 118). As should be appreciated, the common image space may be any suitable image space, and certain image data may be generated, captured, or output in the common image space. For example, the matting data and/or graphics alpha data may be generated in the common image space such that that they are not warped. Furthermore, if utilizing the matting blend 70 or the combined blend 74, the matting data 80 may be combined with the warped captured data 66 to generate matting alpha data (process block 120). Moreover, if utilizing the combined blend 74, the graphics alpha data 94 may be combined with the matting alpha data 82 to generate combined alpha data 96 (process block 122). The layers of the warped graphics data 68 and the warped captured data 66 may then be combined based on the combined alpha data 96, the matting alpha data 82, and/or the graphics alpha data (process block 124). As such, image data from multiple sources (e.g., captured and digitally rendered content) may be combined to provide a more interactive, fluid, realistic, and/or immersive user experience in augmented, virtual, or mixed reality.

Although the flowchart 110 is shown in a given order, in certain embodiments, process/decision blocks may be reordered, altered, deleted, and/or occur simultaneously. Additionally, the flowchart 110 is given as an illustrative tool and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A device comprising:
an electronic display configured to display an image frame based on blended image data; and
image processing circuitry configured to generate the blended image data by combining first image data and second image data via a blend operation, wherein the blend operation comprises:
receiving graphics alpha data indicative of a transparency factor to be applied to the first image data to generate a first layer of the blend operation; and
overlaying the first layer onto a second layer, wherein the second layer is based on the second image data, and wherein overlaying the first layer onto the second layer comprises adding first pixel values of the first image data to second pixel values of the second image data to generate blended pixel values of the blended image data, wherein the first pixel values of the first image data are augmented by the transparency factor, and wherein the first pixel values comprise negative pixel values.

2. The device of claim 1, wherein the transparency factor comprises a per-pixel transparency weighting associated with the first image data, and wherein the blend operation comprises a differential rendering blend.

3. The device of claim 1, wherein the blend operation comprises generating matting data based on the second image data, wherein the matting data is indicative of a first portion of the second image data to be included in the second layer of the blend operation and a second portion of the second image data to be included in a third layer of the blend operation.

4. The device of claim 3, wherein the blend operation comprises overlaying the third layer onto the first layer and the second layer, wherein overlaying the third layer onto the first layer and the second layer comprises using third pixel values of the second portion of the second image data as the blended pixel values of the blended image data at pixel locations associated with the third layer.

5. The device of claim 1, wherein the first image data comprises digitally rendered content.

6. The device of claim 5, wherein the second image data comprises camera-captured content.

7. The device of claim 1, wherein the image processing circuitry is configured to generate the graphics alpha data based on the first image data.

8. The device of claim 1, wherein the image processing circuitry comprises a hardware pipeline having dedicated blend circuitry configured to perform the blend operation.

9. The device of claim 1, wherein the image processing circuitry is configured to warp the first image data, the second image data, and the graphics alpha data to a common image space prior to overlaying the first layer onto the second layer.

10. The device of claim 9, wherein the common image space comprises a display image space, and wherein the display image space is compensated for a lensing effect associated with the electronic display.

11. A method comprising:
receiving first image data comprising positive pixel values and negative pixel values;
generating graphics alpha data indicative of a transparency factor to be applied to the first image data to generate a first layer of a blend operation, wherein the transparency factor is different for the positive pixel values and the negative pixel values;
receiving second image data corresponding to a second layer of the blend operation; and
performing the blend operation by combining the first layer and the second layer, wherein combining the first layer and the second layer comprises adding the positive pixel values and the negative pixel values to corresponding pixel values of the second image data based on the graphics alpha data to generate blended image data.

12. The method of claim 11, comprising warping the first image data and the second image data to a common image space.

13. The method of claim 11, wherein the second image data comprises captured image data.

14. The method of claim 13, comprising generating matting data based on the captured image data, wherein the matting data is indicative of a second transparency factor to be applied to the second image data to differentiate a first portion of the second image data to be included in the second layer and a second portion of the second image data to be included in a third layer of the blend operation.

15. The method of claim 14, comprising combining the first layer, the second layer, and the third layer by adding the positive pixel values and the negative pixel values to the corresponding pixel values of the second image data based on the graphics alpha data and the matting data to generate the blended image data, wherein the corresponding pixel values of the second image data comprise the first portion of the second image data included in the second layer and the second portion of the second image data included in the third layer.

16. The method of claim 11, wherein the first image data comprises digitally rendered content, wherein the positive pixel values correspond to an object of the digitally rendered content, and wherein the negative pixel values correspond to a shadow effect of the object.

17. A method comprising:
receiving first image data comprising captured image content;
generating matting data indicative of a portion of the first image data to be included in a first layer of a blend operation;
combining the matting data and the first image data to generate matting alpha data comprising transparency information, wherein the transparency information designates the portion of the first image data as opaque;
receiving second image data comprising digitally rendered image content to be included in a second layer of the blend operation; and
performing the blend operation by combining the first layer and the second layer, wherein combining the first layer and the second layer comprises adding first pixel values of the first image data to second pixel values of the second image data based on the matting alpha data.

18. The method of claim 17, comprising generating graphics alpha data indicative of a transparency factor corresponding to portions of the second image data, wherein the blend operation comprises a combined matting and differential rendering blend operation.

19. The method of claim 18, comprising combining the graphics alpha data and the matting alpha data to generate combined alpha data, wherein the combined matting and differential rendering blend operation comprises combining the first layer and the second layer based on the combined alpha data.

20. The method of claim 17, wherein the captured image content comprises a real-time camera feed.

\* \* \* \* \*